3,790,562
METHYL CELLULOSE-BORON ALKOXIDE COMPOUNDS

Jett C. Arthur, Jr., Metairie, and Malkiat S. Bains, New Orleans, La., assignors to the United States of America as represented by the Secretary of Agriculture
No Drawing. Filed May 23, 1972, Ser. No. 256,021
Int. Cl. C08b 11/02
U.S. Cl. 260—231 R          16 Claims

ABSTRACT OF THE DISCLOSURE

This invention relates to a method for preparing carbohydrate-boron alkoxide compounds. Under anhydrous conditions, stable compounds of methyl cellulose and boron alkoxides, such as boron ethoxide, boron propoxide, and boron isopropoxide, were prepared in neat boron alkoxide, the parent alcohol, benzene, pyridine, and/or ethylenediamine. The method of this invention has as its objective increasing the reactivity of methyl cellulose with boron alkoxides by treatment in solutions of strong bases, such as pyridine and ethylenediamine. Formation of methyl cellulose-boron alkoxide compounds modifies the rate of oxidation of methyl cellulose and is related to preparing flame-resistant products.

---

A non-exclusive, irrevocable, royalty-free license in the invention herein described, throughout the world for all purposes of the United States Government, with the power to grant sublicenses for such purposes, is hereby granted to the Government of the United States of America.

This instant invention relates to a process for the preparation of carbohydrate-boron alkoxide products.

The method of this invention has as its objective increasing the reactivity of carbohydrates, particularly as their molecular weights increase, with boron alkoxides. As the molecular weight of the carbohydrate increased, its reaction with boron alkoxides neat, in benzene, or in the parent alcohol did not occur or decreased to a very low extent of reaction. It was found that in pyridine or ethylenediamine, the reactivity of carbohydrates toward boron alkoxides increased. Further it was observed that cellulose did not react with the neat alkoxides and reacted with them in pyridine to only a small extent; in ethylenediamine cellulose, both ground and in fiber form, reacted with the alkoxides.

Developments in the commercial use of boron containing compounds, applied to cellulosic textile materials, to modify the rate of oxidation of textiles thereby imparting flame resistance to cellulosic products, have been reported in the literature. Also, the ionization of boric acid is increased in solutions containing carbohydrates. This effect has been used to separate borate complexes of carbohydrates by differential elution from columns of ion exchange resins or by paper ionophoresis. Alkyl borates of carbohydrates are used in Friedel-Crafts reactions to make useful organic compounds.

The instant invention defines methods for the preparation of stable compounds of methyl-α-D-glucoside, methyl-α-D-mannoside, sucrose, cellobiose, methyl cellulose, and cellulose and boron alkoxides, such as boron ethoxide, boron propoxide, and boron isopropoxide. Unexpectedly, it was found that carbohydrates, having a high molecular weight such as purified cotton cellulose (molecular weight 700,000), could be reacted in strong bases, such as ethylenediamine, with boron alkoxides under anhydrous conditions to yield stable compounds. Reaction products of boron alkoxides and carbohydrates are apparently Lewis acids whose properties may be related to the electrophilic character of the glucopyranoside ring. Boron alkoxides are generally electron deficient and would tend to withdraw electrons from the glucopyranoside ring, normally an electron sink. These effects would likely decrease the rate of oxidation of the ring.

The following examples are provided to illustrate the invention and are not intended to limit the invention in any manner whatever.

EXAMPLE 1

Methyl-α-D-glucoside (8 g.) and boron isopropoxide (25 ml.) were added to benzene (100 ml.) in a flask (200 ml.) fitted with a small column and distillation head. The solution was then boiled at reflux; isopropanol formed was removed by azeotropic distillation. When isopropanol was no longer formed, the remaining volatiles were removed at 100° C./0.3 torr. The solid product was analyzed.

*Analysis.*—Calcd. for $[CH_3][C_6H_7O_6][B(OC_3H_7)_2]_4$: B, 6.13%. Found: B, 6.12%.

This product was soluble in benzene after two months of storage.

When this product was heated for about 2 hours at 100° C./0.3 torr, two molecules condensed to yield boron isopropoxide and

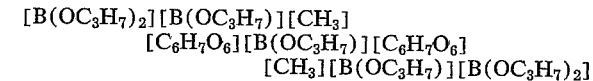

*Analysis.*—Calcd. (percent): B, 6.38; $OC_3H_7$, 48.8. Found (percent): B, 6.43; $OC_3H_7$, 49.1.

EXAMPLE 2

Methyl-α-D-mannoside (5 g.) and boron isopropoxide (25 ml.) were added to benzene (100 ml.) in a flask as described above. The solution was then boiled at reflux; isopropanol formed was removed by azeotropic distillation. The remaining volatiles were removed at 100° C./0.3 torr. The solid product was analyzed.

*Analysis.*—Calcd. for $[CH_3][C_6H_7O_6][B(OC_3H_7)_2]_4$: B, 6.13%. Found: B, 6.09%.

This product was dissolved in a minimum amount of benzene at 78° C. Petroleum ether was added, until a small precipitate was formed. The solution was cooled at 25° C., and a white product, yield about 80%, was obtained. After isolation, this product was not completely soluble in benzene at 25° C. The soluble fraction was recovered as solid after removing the benzene at 25° C./0.3 torr.

*Analysis.*—Calcd. for $[CH_3][C_6H_7O_6][B(OC_3H_7)]_2$: B, 6.56%. Found: B, 6.62%.

EXAMPLE 3A

Sucrose (3 g.) was dissolved in pyridine (50 ml.) at 70° C. Boron propoxide (25 ml.) and benzene (25 ml.) were added to the solution which was then boiled at reflux. Propanol formed was removed by azeotropic distillation. The remaining volatiles were removed at 40° C./0.3 torr. The solid product was analyzed.

*Analysis.*—Calcd. for $[C_{12}H_{14}O_{11}][B(OC_3H_7)_2]_8$: B, 6.33%. Found: B, 6.39%.

Ethylenediamine (10 ml.) was added to this product at 70° C. Then volatiles were removed at 40° C./0.3 torr.

*Analysis.*—Calcd. for $$[C_{12}H_{14}O_{11}][B(OC_3H_7)]_8[N_2C_2H_6]_4$$

(percent): B, 7.69; $N_2C_2H_6$, 20.64. Found (percent): B, 7.65; $N_2C_2H_6$, 20.77%.

EXAMPLE 3B

Sucrose (3 g.) was dissolved in pyridine (35 ml.) at 70° C. Boron propoxide (25 ml.) was added. Then the solution was allowed to stand overnight at 25° C. A white solid product formed. The volatiles were removed at 50° C./0.3 torr. The product was not soluble in benzene. When boron propoxide (10 ml.) was added and the solution was heated to 80° C., the product dissolved. The solution was filtered through a sintered glass apparatus. Then the volatiles were removed at 50° C./0.3 torr.

*Analysis.*—Calcd. for $[C_{12}H_{14}O_{11}][B(OC_3H_7)]_4$: B, 7.05%. Found: 6.97%.

EXAMPLE 3C

Sucrose (2 g.) was dissolved in pyridine (25 ml.) at 70° C. Boron isopropoxide (20 ml.) saturated with ethylenediamine was added at 70° C. Then the solution was boiled at reflux for 10 h. The volatiles were removed at 60° C./0.3 torr. The product was analyzed.

*Analysis.*—Calcd. for $$[C_{12}H_{14}O_{11}][B(OC_3H_7)]_4[N_2C_2H_6]$$

(percent): B, 6.47; $N_2C_2H_6$, 8.68. Found (percent): B, 6.84; $N_2C_2H_6$, 8.91.

EXAMPLE 3D

Sucrose (2 g.) was dissolved in ethylenediamine (15 ml.) at 70° C. Boron propoxide (25 ml.) was added. On cooling a solid product formed. The clear supernatant was decanted, then the remaining volatiles were removed at 70° C./0.3 torr.

*Analysis.*—Calcd. for $$[C_{12}H_{19.5}O_{11}][B(OC_3H_7)_2]_{2.5}[N_2C_2H_6]_{2.5}$$

(percent): B, 3.35; $N_2C_2H_6$, 17.97. Found (percent): B, 3.33; $N_2C_2H_6$, 17.67.

EXAMPLE 4

Cellobiose (2 g.) was dissolved in pyridine (50 ml.) at 110° C. Boron ethoxide (50 ml.) was added to the solution dropwise over a period of 30 minutes. To this clear solution, after 60 minutes, benzene (30 ml.) was added. The solution was boiled at reflux and liquid (35 ml.) was removed dropwise. The solution was cooled to 25° C. and the supernatant liquid decanted. The solid residue was dissolved in benzene (25 ml.) and boron ethoxide (10 ml.); then the reaction mixture was heated at 90° C. for 2 h. The mixture was cooled to 25° C. and the supernatant liquid decanted. The remaining volatiles were removed at 70° C./0.3 torr.

*Analysis.*—Calcd. for $$[C_{12}H_{14}O_{11}][B(OC_2H_5)]_3[B(OC_2H_5)_2]_2$$

(percent): B, 7.69; $OC_2H_5$, 44.82. Found (percent): B, 7.76; $OC_2H_5$, 47.35.

EXAMPLE 5A

Methyl cellulose (5 g.) and boron ethoxide in ethanol (75 ml. of 70% solution) were added to benzene (100 ml.) and then boiled at reflux. Ethanol was removed by azeotropic distillation. The remaining volatiles were removed at 100° C./0.3 torr.

*Analysis.*—Found B, 6.98%. This concentration of B would require trisubstitution of cellulose, as follows: Calcd. for $[C_6H_9O_6][B(OC_2H_5)_2]_3$: B, 6.76%. This would indicate that the methoxyl groups were cleaved during the reaction and removed as methanol from the solution. Alternatively, a boron ethoxide cyclic complex with methyl cellulose could be formed to yield a product containing the amount of B found.

EXAMPLE 5B1

Methyl cellulose (5 g.) and boron propoxide (50 ml.) were boiled at reflux (about 130° C.) for 5 hr. Then benzene (25 ml.) was added, and the propanol removed by azeotropic distillation. The remaining volatiles were removed at 100° C./0.3 torr.

*Analysis.*—Found: B, 2.02%. This concentration of B would require as follows: Calcd. for $$[C_6H_{9.6}O_{4.3}][OCH_3]_{1.7}[B(OC_3H_7)_2]_{0.5}$$

B, 2.02%.

EXAMPLE 5B2

The product of Example 5B1 was mixed with the distillate, and boron propoxide (20 ml.) was added. The mixture was boiled at reflux (about 130° C.) for 8 h.

*Analysis.*—Found: B, 2.85%. This concentration of B would require, as follows: Calcd. for $$[C_6H_{9.5}O_{4.3}][OCH_3]_{1.7}[B(OC_3H_7)_2]_{0.8}$$

B, 2.8%. Repetition of the above procedure did not increase the concentration of B in the product.

EXAMPLE 5B3

The product of Example 5B2 was mixed with pyridine (25 ml.) for 2 minutes and then boron propoxide (50 ml.) was added. The solution was boiled at reflux (about 130° C.) for 1 h., and then distillate (25 ml.) was collected dropwise. The remaining volatiles were removed at 100° C./0.3 torr.

*Analysis.*—Found: B, 4.10%. This concentration of B would require complete substitution, as follows: Calcd. for $$[C_6H_9O_{4.3}][OCH_3]_{1.7}[B(OC_3H_7)_2]_{1.3}$$

B, 3.80%.

EXAMPLE 5C1

Methyl cellulose (3.4 g.), boron isopropoxide (25 ml.) and pyridine (25 ml.) were boiled at reflux for 2 minutes. Then the volatiles were removed at 100° C./0.3 torr.

*Analysis.*—Found: B, 3.50%. This concentration of B would require as follows: Calcd. for $$[C_6H_{9.2}O_{4.3}][OCH_3]_{1.7}[B(OC_3H_7)_2]_{1.1}$$

B, 3.45%.

EXAMPLE 5C2

The product of Example 5C1 was combined with the distillate and then boiled at reflux. About one-third of the distillate was collected dropwise; then the remaining volatiles were removed at 100° C./0.3 torr.

*Analysis.*—Found: B, 4.02; $OC_3H_7$, 42.97%. These concentrations would require complete substitution, as follows: Calcd. for $[C_6H_9O_{4.3}][OCH_3]_{1.7}[B(OC_3H_7)_2]_{1.3}$: B, 3.80; $OC_3H_7$, 41.48%.

EXAMPLE 6A1

Cotton cellulose (3.5 g.), ground to pass a 20-mesh screen, was added to pyridine (30 ml.). After 15 minutes at 25° C., boron propoxide (40 ml.) was added, and the mixture was boiled at reflux for 20 minutes. Then distillate (25 ml.) was removed dropwise at 130° C. The remaining volatiles were removed at 100° C./0.3 torr.

*Analysis.*—Found: B, 0.71%. This concentration of B would require, as follows: Calcd. for $$[C_6H_{9.88}O_5][B(OC_3H_7)_2]_{0.12}:$$

B, 0.70%.

EXAMPLE 6A2

To a fraction of the above product (3 g.), ethylenediamine (10 ml.) was added. After 15 minutes at 25°, boron propoxide (50 ml.) was added. The mixture was boiled at reflux and distillate (20 ml.) was removed dropwise at 130° C. The remaining volatiles were removed at 100° C./0.3 torr.

*Analysis.*—Found: B, 4.06; $C_2N_2H_6$, 11.54%. These concentrations would require, as follows: Calcd. for $[C_6H_{8.5}O_5][B(OC_3H_7)_2]_{1.5}[C_2N_2H_6]_{0.75}$: B, 4.08; $C_2N_2H_6$: 10.96%.

EXAMPLE 6B

Cotton cellulose (5 g.) in fiber form was added to pyridine (50 ml.). After 15 minutes at 25° C., boron isopropoxide (50 ml.) was added, and the mixture boiled at reflux for 4 h. Benzene (25 ml.) was added, and the mixture was boiled at reflux for 3 h. The isopropanol formed was removed by azeotropic distillation. Then the mixture was boiled at reflux overnight (17 h.). Benzene (25 ml.) was added, and the isopropanol formed was removed by azeotropic distillation. The remaining volatiles were removed at 100° C./0.2 torr.

*Analysis.*—Found: B, 0.31%. This concentration of B would require, as follows: Calcd. for $[C_6H_{9.95}O_5][B(OC_3H_7)_2]_{0.05}$: B, 0.32%.

EXAMPLE 6C

Cotton cellulose (5 g.) in fiber form was added to ethylenediamine (50 ml.), benzene (100 ml.), and ethanol (15 ml.). The mixture was boiled at reflux for 5 h., during which time the water—ethanol—benzene azeotrope was removed by distillation. Then boron propoxide (50 ml.) was added, and the mixture was boiled at reflux for 23h. At this time boron propoxide (25 ml.) was added, and the mixture boiled at reflux for an additional 2 h. After cooling to 25° C. the liquid was decanted and the reaction product was washed three times with benzene (50 ml. each time); the liquid was decanted after each washing. Then the product was washed with petroleum ether (50 ml.). The liquid was decanted and the remaining volatiles were removed at 50° C./ 0.3 torr.

*Analysis.*—Found: B, 3.63; $C_2N_2H_6$, 18.86%. These concentrations would require, as follows: Calcd. for $[C_6H_{8.5}O_5][B(OC_3H_7)_2]_{1.5}[C_2N_2H_6]_{1.5}$:

B, 3.68; $C_2N_2H_6$, 19.74%.

We claim:

1. A process for making methyl cellulose-boron ethoxide having the empirical formula $[C_6H_9O_6][B(OC_2H_5)_2]_3$ the process comprising:
 (a) dissolving 5 g. of methyl cellulose in about 75 ml. of boron ethoxide (about 70 percent concentration) in ethanol,
 (b) mixing the solution of (a) with about 100 ml. of benzene and refluxing the mixture then removing ethanol by azeotropic distillation, and
 (c) removing the remaining volatiles at 100° C./0.3 torr.

2. The methyl cellulose-boron ethoxide produced by the process of claim 1.

3. A process for making methyl cellulose-boron propoxide having the empirical formula $[C_6H_{9.8}O_{4.3}][OCH_3]_{1.7}[B(OC_3H_7)_2]_{0.5}$ the process comprising:
 (a) dissolving 5 g. of methyl cellulose in about 50 ml. of boron propoxide and refluxing for about 5 hours at about 130° C.,
 (b) adding about 25 ml. of benzene and removing the propanol formed by azeotropic distillation, and
 (c) removing the remaining volatiles at about 100° C./ 0.3 torr.

4. The methyl cellulose-boron propoxide produced by the process of claim 3.

5. A process for making a methyl cellulose-boron propoxide having to empirical formula $[C_6H_{9.5}O_{4.3}][OCH_3]_{1.7}[B(OC_3H_7)_2]_{0.8}$ the process comprising:
 (a) mixing the product produced by the process of claim 3 with the distillate of said process and adding about 20 ml. of boron propoxide,
 (b) refluxing the mixture for about 8 hours at about 130° C.,
 (c) adding about 25 ml. of benzene and heating to remove the propanol thus produced by azeotropic distillation, and
 (d) removing the remaining volatiles at 100° C./0.3 torr.

6. The methyl cellulose-boron propoxide produced by the process of claim 5.

7. A process for making a methyl cellulose-boron propoxide having the empirical formula $[C_6H_9O_{4.3}][OCH_3]_{1.7}[B(OC_3H_7)_2]_{1.3}$ the process comprising:
 (a) mixing thoroughly the product produced by the process of claim 5 with about 25 ml. of pyridine,
 (b) adding about 50 ml. of boron propoxide,
 (c) refluxing the solution for 1 hour at about 130° C.,
 (d) distilling about 25 ml. of the volatiles off dropwise, and
 (e) removing the remaining volatiles upon heating at 100° C./0.3 torr.

8. The methyl cellulose-boron propoxide produced by the process of claim 7.

9. A process for making a methyl cellulose-boron isopropoxide having the empirical formula $[C_6H_{9.2}O_{4.3}][OCH_3]_{1.7}[B(OC_3H_7)_2]_{1.1}$ the process comprising:
 (a) mixing 3.4 g. mehtyl cellulose with about 25 ml. of boron isopropoxide and about 25 ml. of pyridine,
 (b) refluxing for 2 minutes, and
 (c) removing the volatiles at about 100° C./0.3 torr.

10. The methyl cellulose-boron isopropoxide produced by the process of claim 9.

11. A process for making a methyl cellulose-boron isopropoxide having the empirical formula $[C_6H_9O_{4.3}][OCH_3]_{1.7}[B(OC_3H_7)_2]_{1.3}$ the process comprising:
 (a) mixing the product produced by the process of claim 9 with the distillate of said process,
 (b) refluxing the mixture for time required to remove dropwise about one-third of the distillate by distillation, and
 (c) removing the remaining volatiles at 100° C./0.3 torr.

12. The methyl cellulose-boron isopropoxide produced by the process of claim 11.

13. A process for making a cotton cellulose-boron propoxide derivative having the empirical formula $[C_7H_{9.88}O_5][B(OC_3H_7)_2]_{0.12}$ the process comprising:
 (a) grinding about 3.5 g. of cotton cellulose to pass a 20-mesh screen,
 (b) adding about 30 ml. of pyridine and agitating for about 15 minutes at 25° C.,
 (c) adding about 40 ml. boron propoxide to the mixture of (b) and refluxing for about 20 minutes,
 (d) removing about 25 ml. of the distillate dropwise at about 130° C., and
 (e) removing the remaining volatiles at 100° C./0.3 torr.

14. The cellulose-boron propoxide produced by the process of claim 13.

15. A process for making a cotton cellulose-boron propoxide derivative having the empirical formula

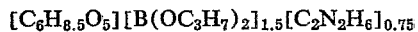

the process comprising:
(a) mixing thoroughly at room temperature 3 g. of the product produced by the process of claim 13 with about 10 ml. of ethylenediamine,
(b) adding about 50 ml. of boron propoxide to the mixture and refluxing for time required to remove about 20 ml. of the distillate dropwise at 130° C. and
(c) removing the remaining volatiles at 100° C./0.3 torr.

16. The cellulose-boron propoxide produced by the process of claim 15.

References Cited

UNITED STATES PATENTS 3,231,561  1/1966  Brunelle et al. _____ 260—209 R

DONALD E. CZAJA, Primary Examiner

M. I. MARQUIS, Assistant Examiner

U.S. Cl. X.R.

8—180, 181; 260—45.7 R, 209 R, 210 R, 212, 231 A